United States Patent [19]

Schnacke

[11] Patent Number: 4,510,213
[45] Date of Patent: Apr. 9, 1985

[54] FUEL CELL STACK WITH INTERNAL MANIFOLDS FOR REACTANT GASES

[75] Inventor: Arthur W. Schnacke, Schenectady, N.Y.

[73] Assignee: The Unites States of America as represented by the Department of Energy, Washington, D.C.

[21] Appl. No.: 541,185

[22] Filed: Oct. 12, 1983

[51] Int. Cl.³ .............................................. H01M 2/08
[52] U.S. Cl. ...................................... 429/36; 429/72; 429/185
[58] Field of Search ..................... 429/34–39, 429/72, 185

[56] References Cited

U.S. PATENT DOCUMENTS

| | | | |
|---|---|---|---|
| 3,012,086 | 12/1961 | Vahldieck | 136/86 |
| 3,188,242 | 6/1965 | Kordesch et al. | 429/36 |
| 3,253,958 | 5/1966 | Shinn | 136/86 |
| 4,212,929 | 7/1980 | Grevstad et al. | 429/37 |
| 4,233,369 | 11/1980 | Breault | 429/36 X |
| 4,317,864 | 3/1982 | Strasser | 429/36 |
| 4,345,009 | 8/1982 | Fahle | 429/37 |
| 4,414,294 | 11/1983 | Guthrie | 429/35 |

OTHER PUBLICATIONS

"Stack Design", Bond, J. A., 1982 National Fuel Cell Seminar, Newport Beach, Cal., Nov. 14–17, 1982.

Primary Examiner—Charles F. Le Fevour
Attorney, Agent, or Firm—Hugh W. Glenn; Robert J. Fisher

[57] ABSTRACT

A fuel cell stack includes a plurality of plate-like fuel cells arranged along an axis generally parallel to cell thickness with electrically conductive separator plates between each pair of cells. A plurality of axial manifolds are provided at opposite sides of the stack in outer marginal portions beyond the edges of electrodes and electrolyte tiles. Sealing rings prevent cross-leakage of oxidant fuel gases through use of pairs of outwardly extending lips from opposite tile surfaces bonded to first and second electrode frames respectively. The frames provide transition between electrode edges and manifold perimeters. The pairs of extension lips are sealingly bonded together through an electrically insulative sealing ring with wedge shaped fastening members.

13 Claims, 7 Drawing Figures

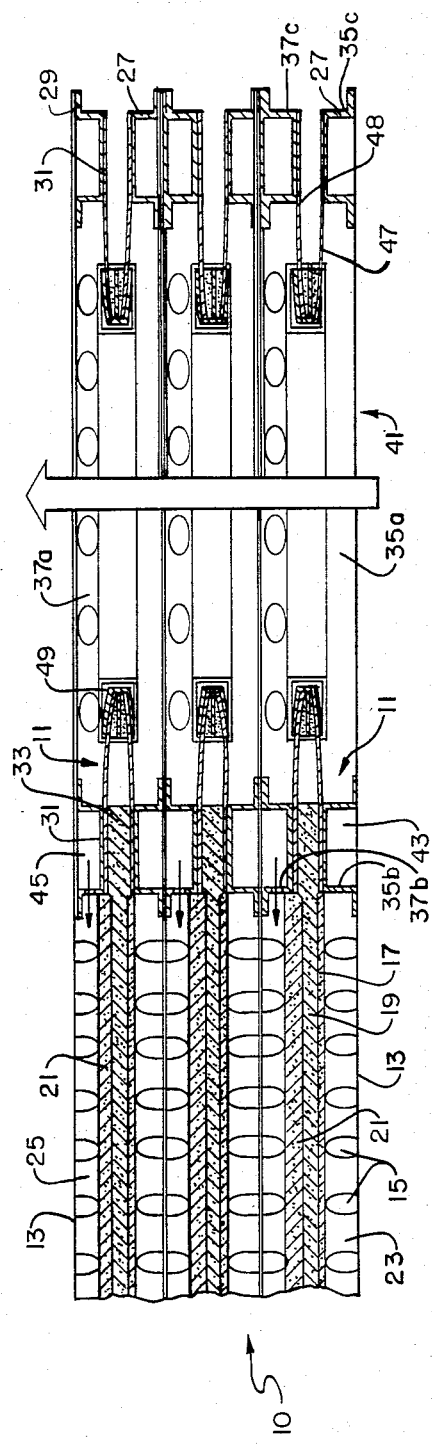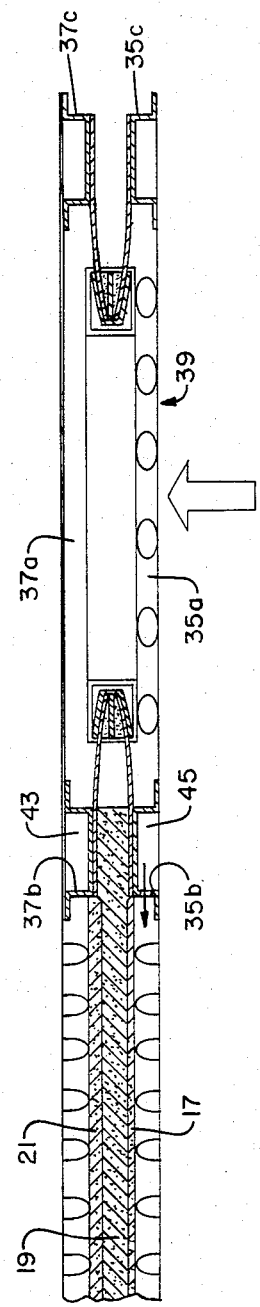

4,510,213

FUEL CELL STACK WITH INTERNAL MANIFOLDS FOR REACTANT GASES

CONTRACTUAL ORIGIN OF THE INVENTION

The United States Government has rights in this invention pursuant to Contract No. DE-AC02-80ET17019 between the U.S. Department of Energy and General Electric Company.

BACKGROUND OF THE INVENTION

This invention relates to electrochemical cells requiring the flow of reactant gases or fluids into and from the cell. For instance, both fuel cells and electrolysis cells require provision for gas or liquid access and discharge. The invention is particularly applicable to stacks of fuel cells employing molten carbonate salts and mixtures of such salts as electrolyte. Such a fuel cell will include an anodic electrode spaced from a cathodic electrode by an porous tile or medium of ceramic material for retaining molten electrolyte. Reactant gases, for instance air to the cathode and a fuel such as hydrogen to the anode are provided at electrode surfaces opposite the electrolyte. The electrodes permit the reactant gas to diffuse into contact with the electrolyte at a layer containing a catalyst to promote electrochemical reaction resulting in the generation of an electric current. In a stack of bipolar fuel cells, the anode of one cell is in electrical communication with the cathode of the adjacent cell to effectively place the stack in electrical series. Accordingly, useful electric current can be provided through connection to terminals at opposite ends of the stack. In order to provide good electrical conduction between cells, compressive forces are exerted at both ends of the stack.

One of the major problems in operating a fuel cell stack is that of providing distribution of reactant fluids to the electrodes without loss or cross-leaking of reactants. Previous efforts have employed both internal and external manifolds for distributing the gases. U.S. Pat. No. 3,012,086 illustrates internal manifolding of reactant gases through axial passages in the peripheral portions of the cell components.

Fuel cell stacks with external manifolds are illustrated in U.S. Pat. No. 4,345,009. This design employs large manifolds covering the side surfaces of opposite fuel cell stacks to admit reactants and withdraw reaction products. Four such manifolds are typically required per stack for entry and discharge of the two reactants. Manifolds of this type are particularly difficult to seal at the stack side surfaces which may not be level over the length of the stack. Also, the stack height may vary from compressive yield resulting from the axial load required for a properly operating stack. The compression of components and the variations resulting from temperature expansion and contraction can result in substantial movement of the stack relative to the manifold and the sealing gasket. Such movement and stresses may result in cross-leaking of reactant gases between adjacent fuel cells within the stack. In addition, inert cover gas surrounding a stack may leak into the manifolds diluting the reactant gas and wasting the cover gas. One other major disadvantage of a stack with external manifolds is the large voltage difference across the sealing gasket between the manifold and the stack. This potential difference can be as much as 500 volts. When the reactant gas manifolds are grounded, electrolyte wetting or a gasket defect can result in shunt currents of significant magnitude across the manifold seal.

Many of these problems are minimized through use of a fuel cell stack with internal manifolds. However, such a stack greatly adds to the cost of cell components due to required openings and seals for manifold gas flow. Cross-leaking can remain a serious problem as complex internal seals internal to cell components are needed.

It is therefore an object of the present invention to provide a fuel cell stack design to minimize the problems associated with internal and external manifolds for reactant gas.

It is a further object to provide a fuel cell stack with minimal voltage drop across reactant gas seals.

It is a further object to provide a fuel cell stack with reactant gas seals that undergo minimal loss and sealing effectiveness resulting from temperature variations and compressive creep of components.

It is also an object to provide an improved sealing means for minimizing cross-leakage between reactant gases.

Therefore, in accordance with the present invention, sealing means are provided for preventing cross-leakage of reactant gases between electrodes of opposite polarity in an electrolytic cell. The cell includes first and second electrodes of opposite polarity, a porous medium for electrolyte separating said electrodes, separator means in electrical communication with at least one electrode for the separation of an adjacent cell in a stack of cells, and first and second manifold means for providing first and second reactive fluids to the first and second electrodes respectively. The sealing means include first and second transition frames sealingly engaging a marginal surface of the porous electrolyte medium and extending outwardly beyond the medium edges to circumscribe the manifolds for reactant gases. Sealing rings are disposed between the first and second transition frames outwardly from the porous electrolyte medium to prevent cross-leakage of the first and second reactant fluids passing through separate manifolds.

In more specific aspects, the individual cells are of plate-like shape with major surfaces normal to the cell thickness and edge surfaces parallel to cell thickness. The marginal surface of the porous electrolyte medium extends parallel to but beyond the major surfaces of the cell electrodes. These margins are supported by contact with the first and second transition frames at opposite surfaces of the electrolyte medium.

In one other aspect, the transition frames include base surfaces generally parallel to the major surfaces of the cell. The base surfaces support the porous electrolyte medium and extend outwardly beyond the electrode edges into communication with the manifolds. The frames also have side walls with apertures communicating with the manifolds.

In further aspects, the manifolds include first and second manifold passages axially parallel to the cell thickness in the stack. The passages are circumscribed by axial side wall surfaces of the transition frames and sealing rings are disposed between the first and second transition frames at the manifold passages.

In one other aspect, the transition frames include base walls parallel to major surfaces of the cell components and extend outwardly to form marginal extensions beyond opposite edges of each of the cell electrodes. Axial side walls of the transition frame are parallel to the cell thickness and include internal side walls engaging edge surfaces of the electrodes, external side walls disposed at outer edge surfaces of the cell and perimetric side walls circumscribing the manifold perimeters. Each of these axial side walls extend into engagement with the cell separator sheet to define first and second plenums for gas distribution to the first and second electrodes of opposite polarity respectively.

In still further aspects of the invention, the first transition frame includes perimetric side walls with apertures communicating only with the first manifold passage and internal side walls with apertures communicating only with the first electrodes. The second transition frame includes perimetric side walls with apertures communicating only with the second manifold passage and internal side walls with apertures communicating only with the second electrode.

In a further aspect of the invention, the sealing rings include first and second extension lips extending from sealing and supporting engagement with the base walls of the first and second transition frames respectively at the opposing marginal surfaces of the electrolye porous medium. The lips slant inwardly at perimetric edge portions around the openings of the manifold passages. The sloping portions are separated by electrically insulative and sealing wedges of annular shape and are fastened together by a locking device including an annular shoe having a wedge shaped groove in its outer axial surface. The wedge shaped groove sealingly receives the extension lips at their slanting edges separated by the sealing wedges. The locking device is of annular shape provided with tapered segments which can be tightened onto the extension lips by expansive outward forces applied to internal axial surfaces of the manifold passages. In addition, locking tabs are provided at the internal surfaces of the locking device to secure the tapered segments in position.

In a specifically described aspect of the invention, a fuel cell stack includes a plurality of fuel cells each of plate-like shape arranged in the stack along an axis generally parallel to the cell thickness and perpendicular to the plane of an individual cell. A plurality of electrically conductive separator sheets, at least one each disposed generally parallel to the cell plane, are in electrical communication with the electrode of one cell and at its opposite surface, with the electrode of opposite polarity of the adjacent cell. The sheets include projective means for contacting an adjacent electrode to maintain space for reactive gas distribution to that electrode. The sheets have outwardly extended margins beyond the edges of the electrodes with openings aligned in the margins to form axially parallel manifold arrays along end portions of the stack. Each of the cells include at least two electrodes of opposite polarity separated by a porous tile for electrolyte arranged generally parallel to the cell plane. The tile has marginal extensions beyond the electrode edges and towards but not meeting the manifold arrays of openings. Transition frames are positioned about the electrodes in planar extensions thereof. The frames have base walls generally parallel to the cell plane in supporting contact with the marginal extensions of the tile. In addition, generally axial side walls extend from the base walls to engage the separator sheets. These side walls include perimetric side walls around the aligned openings through the separator sheets in definition of the axial manifolds and also include other side walls along the edges of the electrodes. The transition frames include a first set in planar extension with one group of electrodes and a second set in planar extension with the other group of electrodes of opposite polarity. The first set has side walls with apertures within the first axial manifold and along the edge of the first group of electrodes but with impermeable side walls within the second axial manifold. The second set of transition frames has side walls with apertures within the second axial manifold and along the edge of the electrodes of opposite polarity. The second set include impermeable side walls within the first axial manifold so that fuel gas is directed to the electrodes of first polarity and oxidant gas to the electrodes of opposite polarity. Wedge shaped sealing rings have angled sealing surfaces between adjacent transition frames of the first and second sets along the length of the axial manifolds. These rings include circumferential extension lips sealingly bonded to the base walls of the transition frames and in contact with the marginal extension of the electrolyte tiles to prevent cross-leakage of fuel and oxidant gases. Annular spaces remain between the internal surfaces of these extension lips and are left open to the outside surfaces of the cell stack such that inert cover gas can be provided to the outside perimeter of the sealing rings and the marginal extension of the electrolyte tiles.

In still further specific aspects as least two electrically conductive separator sheets can be provided with each cell to seal an individual cell from adjacent cells. Such additional sheets permit the removal of individual cells from the stack when axial compression is released.

BRIEF DESCRIPTION OF THE DRAWINGS

The present invention is illustrated in the accompanying drawings wherein:

FIG. 1 is a cross-sectional fragmentary and partially schematic view of a fuel cell stack taken through a first manifold.

FIG. 2 is a cross-sectional fragmentary and partially schematic view of a single fuel cell taken through a second manifold.

DETAILED DESCRIPTION OF THE PREFERRED EMBODIMENT

Figure 3:
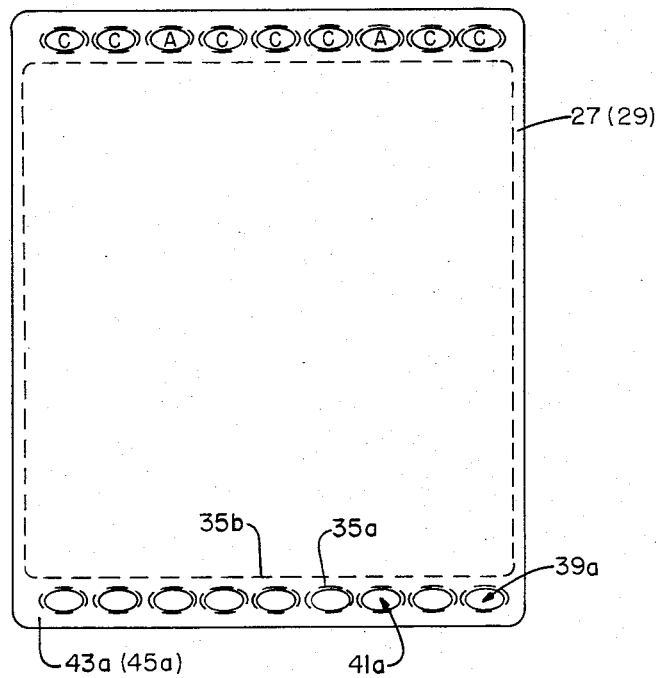
FIG. 3 is a top schematic view of an individual fuel cell illustrating an electrode transition frame.

One embodiment of the present invention is described hereinafter by reference to the drawings. In particular, FIG. 1, shows a fragmentary portion of the fuel cell stack 10 including a plurality of individual fuel cells 11. The individual cells 11 are of flat or plate-like shape arranged in the stack along their thickness with their major surfaces facing adjacent cells. Individual cells are separated from one another by electrically conductive separator sheets 13 parallel to the major surfaces. Two separator sheets per cell are illustrated to seal an individual cell and permit its removal from the stack when axial compression is released. The separator sheets 13, illustrated schematically, include projections 15 from their inwardly facing major surfaces for engagement with adjacent cell components.

Each cell is illustrated with a cathode 17, a porous tile 19 for electrolytic salt and a gas permeable anode 21. The projections 15 on the internal surface of the separator sheet 13 provide gas distribution spaces 23 and 25 directed to the cathode 17 and anode 21 respectively. The two electrodes are gas permeable to permit reactant gases to contact the electrolyte at the tile 19 surface in the presence of the electrode catalyst whereby an electrochemical reaction occurs to generate an electrical current. As is seen, the cells are in a bipolar stack and are thus effectively in electrical series.

The fuel cell stack as heretofore presented is merely one arrangement of a typical stack. Various modifications can be incorporated into the stack and cell components in well known manner. For instance, the separator sheets may include the dimple-like projections as shown or corrugations, fins or other projections can be used at 15 to provide for gas spaces 23 and 25. Where corrugations are used a single separator sheet per cell can provide space on its two sides for distribution of the oxidant and fuel gases to the corresponding electrode. Also, separator sheets 13 may serve as or in combination with current collectors for the electrodes. The electrode catalyst can be of several types of materials including, for instance, nickel anodes and nickel oxide cathodes. Porous ceramic compacts such as lithium aluminate provide suitable matrices for the electrolyte in the porous tile 19. Molten alkali metal and alkaline earth metal carbonates and mixtures of these salts are typically employed as electrolyte in these high temperature fuel cells.

Applicants have invented a novel sealing means for use with the above-described stack of cells. The sealing means prevents leakage of gases between opposing electrode chambers and minimizes leakage of externally applied inert gas into dilution within the reaction gases.

For an illustration of applicant's invention reference is first made to FIGS. 1, 2 and 3. In FIG. 1 a cross section through one of two separate manifold passages is illustrated. For instance this passage 41 may communicate with anode chambers in the fuel cell stack for the distribution of fuel gas. In FIG. 2 a cross section through a separate manifold passage 39 is shown through a single cell. Passage 39 can transmit the correlative reactant gas, for instance air or oxygen to the cathode chambers. A top view of a fuel cell in reduced size is illustrated schematically in FIG. 3. The manifold passages are shown with designations "A" or "C" corresponding to one arrangement for providing "Anode" or "Cathode" reactant gases.

First and second transition frames 27 and 29 are shown at the outer edge surfaces of the first 17 and second 21 electrodes respectively. Base walls or surfaces 31 of the transition frames sealingly engage and support marginal extensions 33 of the electrolyte tile 19. This firm support of these marginal extensions is of considerable importance as tile 19 generally is a porous and frangible component that can be degraded or distorted through compressive creep or temperature variations throughout the cell life. The transition frames also include axial side walls 35 and 37 parallel to the stack axis and the cell thickness. The side walls include 35A and 37A which circumscribe the manifold passages 39 and 41, internal side walls 35B and 37B which engage the edge surface of the cathode 17 and anode 21 respectively, and external side walls 35C and 37C. These side walls extend axially into engagement with an adjacent separator sheet 13 to define plenums 43 and 45 for distribution of the two reactant gases respectively. The location of a second similar plenum 43A (45A) is illustrated in FIG. 3 at the opposite side of the cell stack for receiving discharge gases from the fuel cells. Similarly, manifold passages 39A and 41A transmit the discharge gases from the stack.

Figure 4:
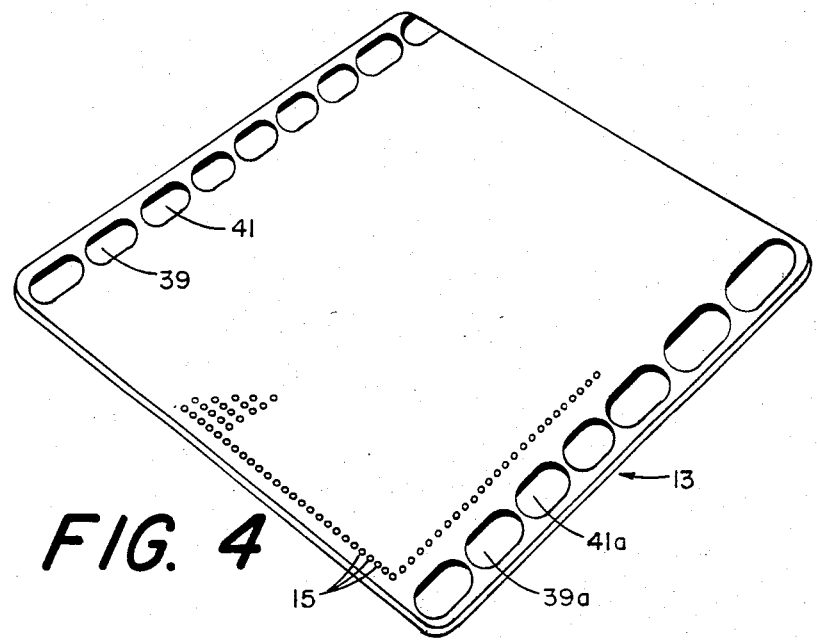
FIG. 4 is a perspective view of a separator sheet.
Figure 4A:
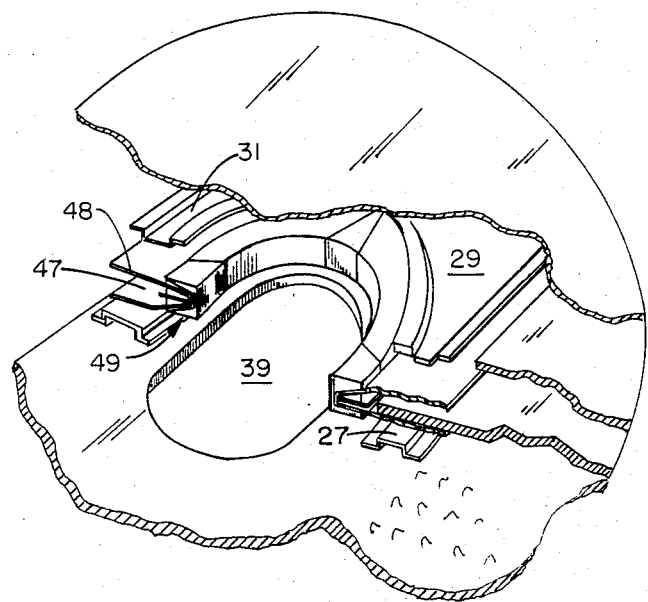
FIG. 4A is an enlarged perspective fragmentary view partially broken away of a manifold seal.
Figure 4B:
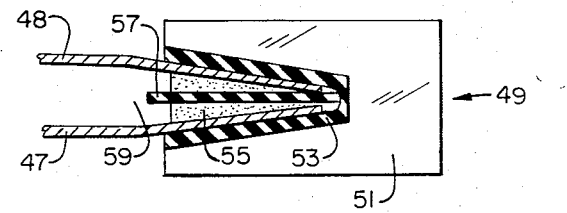
FIG. 4B is an enlarged cross-sectional view of a sealing ring segment.

Referring now in addition to FIGS. 4, 4A and 4B, the sealing rings 49 are described. Rings 49 are disposed between first 27 and second 29 transition frames in axial alignment within manifold passages 39 and 41. First and second extension lips 47 and 48 are bonded to the base walls 31 of the transition frames 27 and 29. These extension lips have proximal portions sealing against the marginal extensions 33 (FIG. 1) of the electrolyte tile at opposing surfaces and distal end portions sealingly engaging sealing rings 49 at the manifold passages 39 and 41.

The extension lips 47 and 48 may be of a non-porous form of the same type material as selected for the gas permeable anode. In practice the lips may be an extension of the electrodes, integral with the anode but attached to the oxide material of the cathode.

Sealing ring 49 joins the first and second extension lips within the manifold passages with fitted tapered shoes 51 in engagement with the extension lips slanting surfaces. Shoes 51 are illustrated with a tapered insert 53 of electrically insulating material for instance, zirconium oxide of alumina to provide sealing surfaces in engagement with extension lips 47 and 48. Tapered wedges 55 and an electrically insulating and sealing gasket 57 are shown to complete the electrical separation of the two lips. This seal between the extension lips permits filling space 59 therebetween with the inert cover gas for instance, nitrogen that surrounds the fuel cell stack. This nitrogen or inert gas is typically maintained at a higher pressure than that of the reactant gases to prevent cross leakage through the manifold seals in favor of inward leakage of the inert gas.

By locating sealing ring 49 inwardly in respect to the manifold passages from the edges of the electrolyte tile, the inert cover gas has full access to all edges of the tile. Thus, the wet seals between electrode and electrolyte surfaces are blanketed with pressurizied inert gas to further insure against cross leakage of reactant gases.

Figure 5:
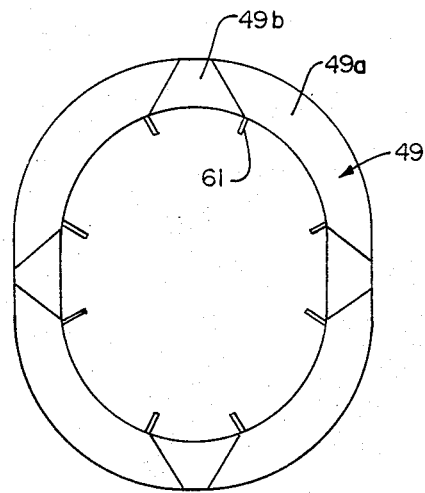
FIG. 5 is a top view of a sealing ring around a manifold opening.

As is seen in FIG. 5, sealing ring 49 includes a plurality of wedge-like segments 49A and 49B for exerting the sealing pressure at interfacial surfaces of the extension lips and the tapered sealing ring components. Outward or expansive forces from within the manifold opening effectively wedge the segments under pressure into position. Locking tabs 61 are illustrated as one means for maintaining the wedge segments in pressurizing engagement with the extension lips.

Applicants' sealing ring design thus minimizes adverse effects of compressive creep within the fuel cell stack. The manifold seals are not affected by individual tile creep which should cause only minor deflection of the extension lips in a bellowslike manner.

It is thus seen that the present invention provides an improved sealing means for a fuel cell stack. The sealing means permits use of internal manifolds while minimizing cross leakage between the reactant gases. The seals provide bellows like compliance to increase effectiveness in sealing over large temperature variations and potential compressive creep of the stack components. The manifold seals are positioned between individual cells such that only a small voltage difference exists thus minimizing shunt current loss within the fuel cell stack.

Although the present invention is described in terms of specific embodiments, it will be clear to one skilled in the art that various modifications in the structures, materials and components can be made within the scope of the following claims.

The embodiments of this invention in which an exclusive property or privilege is claimed are defined as follows:

1. Sealing means for preventing cross leakage of reactant gases between electrodes of opposite polarity in an electrolytic cell, said cell includes, in an axially aligned stack of components, first and second electrodes of opposite polarity, a porous medium for electrolyte separating said electrodes, a separator sheet in electrical communication with at least one electrode for the separation of an adjacent cell in a stack of cells, and first and second manifold passages for providing first and second reactant fluids to said first and second electrodes respectively, said sealing means comprising:

first and second transition frames in said stack of components supporting marginal surfaces of said porous electrolyte medium beyond the electrode edges and extending outwardly beyond said medium edges to said manifold passages, said transition frames including base walls generally parallel to major surfaces in said stack of components and perimetric side walls extending axially from the base walls to circumscribe said manifold passages, sealing rings disposed between said first and second transition frames outwardly from said porous electrolyte medium and generally coaxially with said manifold passages, and first and second extension lips bonded at proximal portions thereof to base walls of said transition frames at the marginal surfaces of said electrolyte medium and extending outwardly beyond said medium edges to sealingly fasten at distal portions thereof to said sealing rings whereby cross leakage of said first and second reactant fluids in minimized.

2. The sealing means of claim 1 wherein said cell is of plate-like shape having major surfaces normal to the cell thickness and edge surfaces parallel to cell thickness, said marginal surfaces of said porous electrolyte medium extending parallel to but beyond the major surfaces of said cell electrodes and being supported by contact with said first and second transition frames at opposite surfaces of said electrolyte medium.

3. The sealing means of claim 2 wherein said transition frames include axially parallel side walls with apertures therein for permitting flow of reactant gas from said manifold passages to said electrodes.

4. The sealing means of claim 3 wherein the base walls of said transition frames are parallel to said major surfaces of said cell and extend outwardly to form marginal extensions beyond opposite edges of each of said electrodes, said side walls are parallel to cell thickness and include internal side walls engaging edge surfaces of said electrodes, external side walls at the outer edge surfaces of said cell and said perimetric side walls circumscribing the perimeters of said manifold passages, said side walls engaging said separator sheets to define first and second plenums for gas distribution to said first and second electrodes respectively.

5. The sealing means of claim 4 wherein said first transition frame includes perimetric side walls with apertures communicating only with said first passage and internal side walls with apertures communicating only with said first electrode while said second transition frame includes perimetric side walls with apertures communicating only with said second manifold passage and internal side walls with apertures communicating only with said second electrodes.

6. The sealing means of claim 1 wherein said sealing rings comprise electrically insulative and sealing wedges of annular shape disposed between said first and second extension lips at their distal portions and electrically insulating wedge locking means for fastening said distal portions of the extension lips onto said sealing wedges.

7. The sealing means of claim 6 wherein said locking means includes annular shoes having a wedge-shaped groove in its outer axial surface for sealingly receiving said extension lip distal portions separated by said sealing wedges.

8. The sealing means of claim 7 wherein said locking means is of annular shape and is provided with tapered segments whereby expansive forces applied at internal axial surfaces tighten said locking means onto said extension lips, said locking means further including locking tabs at said internal surface to secure said tapered segments in position.

9. A fuel cell stack comprising a plurality of fuel cells each of plate-like shape arranged in said stack along an axis generally parallel to cell thickness and perpendicular to the major surfaces of an individual cell;

a plurality of electrically conductive separator sheets at least one each disposed generally parallel to the cell major surfaces, said sheets in electrical communication with the electrode of one cell and at its opposite surface with the opposite electrode of the adjacent cell, said sheets including projective means for contacting an adjacent electrode and for maintaining space for reactant gas distribution to said electrode, said sheets having outwardly extending margins beyond the edge of said electrodes with openings aligned in said margins to form axially parallel manifold arrays along end portions of said stack;

each of said cells including at least two electrodes of opposite polarity separated by a porous tile for electrolyte arranged generally parallel to major surfaces of the cell, said tile having marginal extensions beyond the electrode edges and towards but not overlapping said manifold arrays of openings;

a plurality of transition frames in planar extension respecting said electrodes, said frames having base walls generally parallel to the cell major surfaces in supporting contact with said marginal extensions of said tile and also having generally axially parallel side walls extending from said base walls to said separator sheets, said side walls including perimetric walls circumscribing the aligned openings through said separator sheets to define axial manifolds for gas flow along said cell stack and having edge-wise side walls along the edges of said electrodes;

said plurality of transition frames including a first set of transition frames in planar extension with electrodes of a first polarity and a second set of transition frames in planar extension with electrodes of opposite polarity, said first set including side walls with apertures within a first axial manifold and along the edge of a first electrode, but with impermeable side walls within a second axial manifold and said second set including side walls with apertures within a second axial manifold and along the edge of an electrode of said opposite polarity but with impermeable side walls within said first axial manifold, whereby oxidant gas is directed to said electrodes of first polarity and fuel gas is directed to said electrodes of opposite polarity;

a plurality of wedge-shaped sealing rings spaced along the length of said axial manifold passages, said rings having angled sealing surfaces disposed one each between adjacent transition frames of said first and second sets thereof, said rings engaging circumferential extension lips extending from said angled sealing surfaces thereof into bonded engagement with the base walls of said transition frames in contact with the marginal extensions of said tiles to prevent cross leakage of fuel and oxidant gases and to define spaces for inert gas cover to the outside perimeter of said sealing rings and tile marginal extensions.

10. The fuel cell stack of claim 9 wherein at least two electrically conductive separator sheets, one each sealed to adjacent cells are included between each pair of cells in said stack.

11. The fuel cell stack of claim 9 wherein a plurality of axial manifold passages are included at opposite marginal portions of said cell stack.

12. The fuel cell stack of claim 11 wherein said axial manifold passages are disposed outwardly from said tile marginal extensions and electrode edges.

13. A fuel cell stack comprising a plurality of fuel cells arranged in a stack with major surfaces facing adjacent cells and a plurality of electrically conductive separator sheets disposed at least one each between adjacent cells, said sheets having projective means at major surfaces extending into electrical contact with adjacent electrodes to provide distribution space for reactant gases, said sheets further including outwardly extending margins at opposite sides of the stack beyond the fuel cell edges, said separator sheet margins provided with axial arrays of aligned openings circumscribing manifold passages for reactant gas, each of said fuel cells including first and second electrodes of opposite polarity separated by a porous tile for containing electrolyte, said tile having marginal extentions outwardly along major surfaces beyond the edges of the electrodes, said electrodes and tile are arranged in a stack with major surfaces facing, each cell further including extension lips from the marginal extension of the tile surfaces and a sealing ring engaging said lips at the perimeter of said manifold passages, said sealing ring comprising in combination a tapered shoe and a correspondingly tapered wedge for sealingly connecting said extension lips at said manifold passages; and first and second transition frames sealingly engaging and supporting the marginal extensions of said porous electrolyte tile, said transition frames including axial side walls extending to said separator sheet defining a plenum for gas distribution into said first and second electrodes respectively, said side walls including perimetric side walls circumscribing and defining said manifold passages in axial alignment with said arrays of opening in said separator sheets and internal side walls with apertures communicating with said gas space between electrodes and separator sheets, said perimetric side walls including apertures in communication with said manifold passages, whereby gas flow is permitted from the manifold passage to the gas distribution plenum to the gas space between electrodes and separator sheets.

* * * * *